United States Patent Office 3,354,331
Patented Nov. 21, 1967

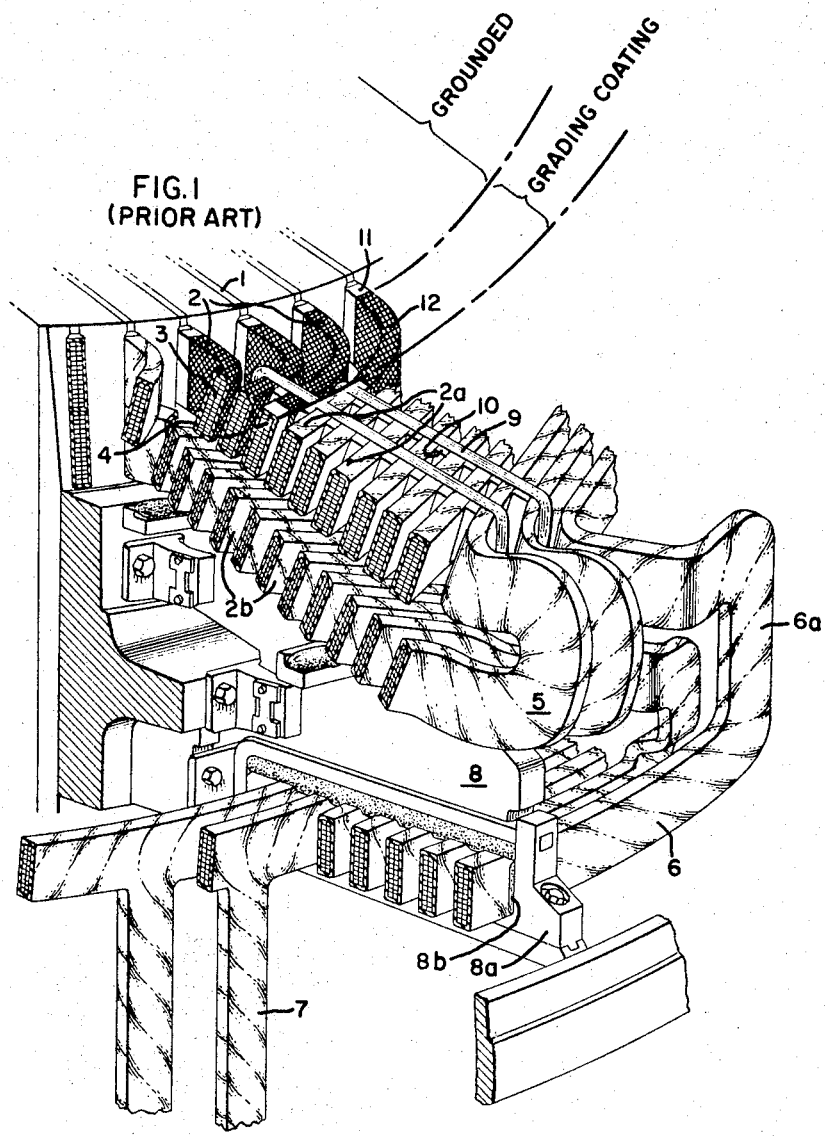

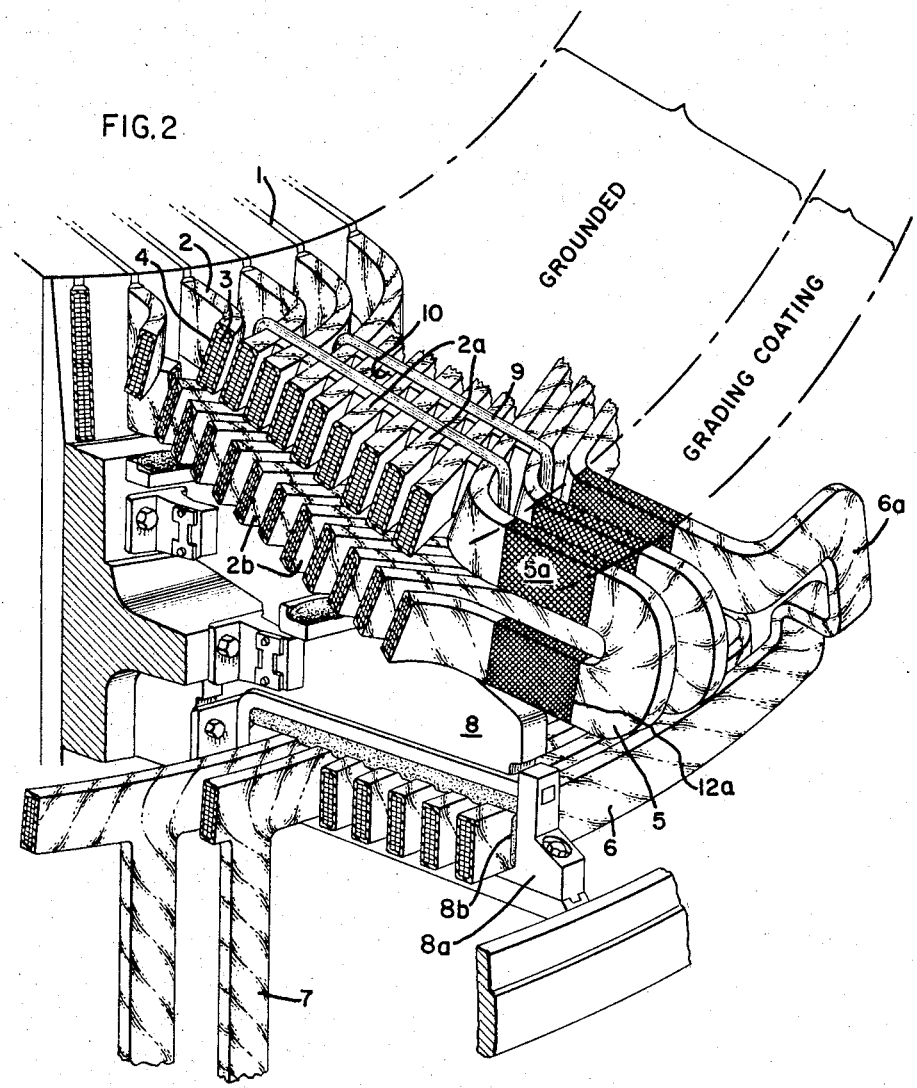

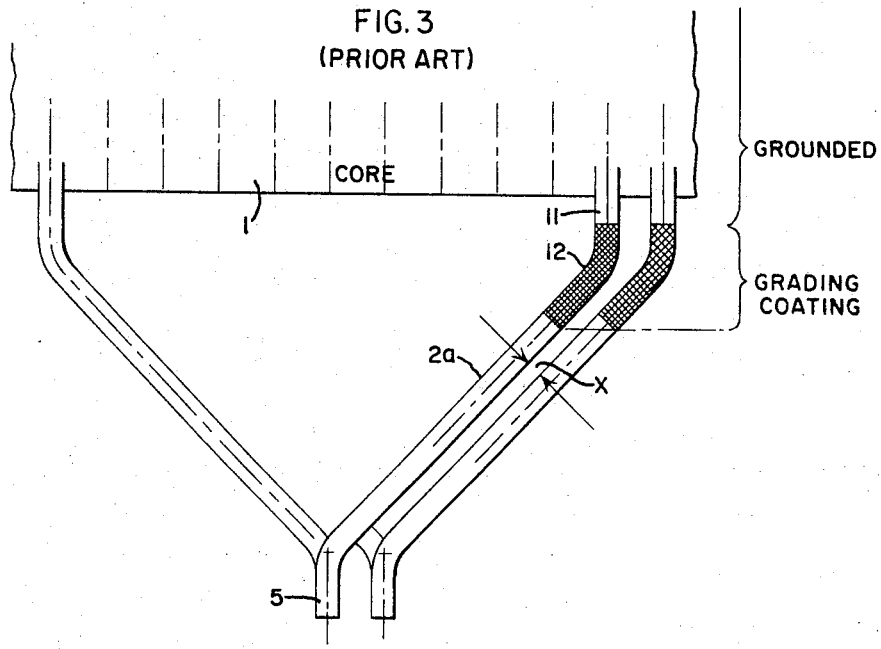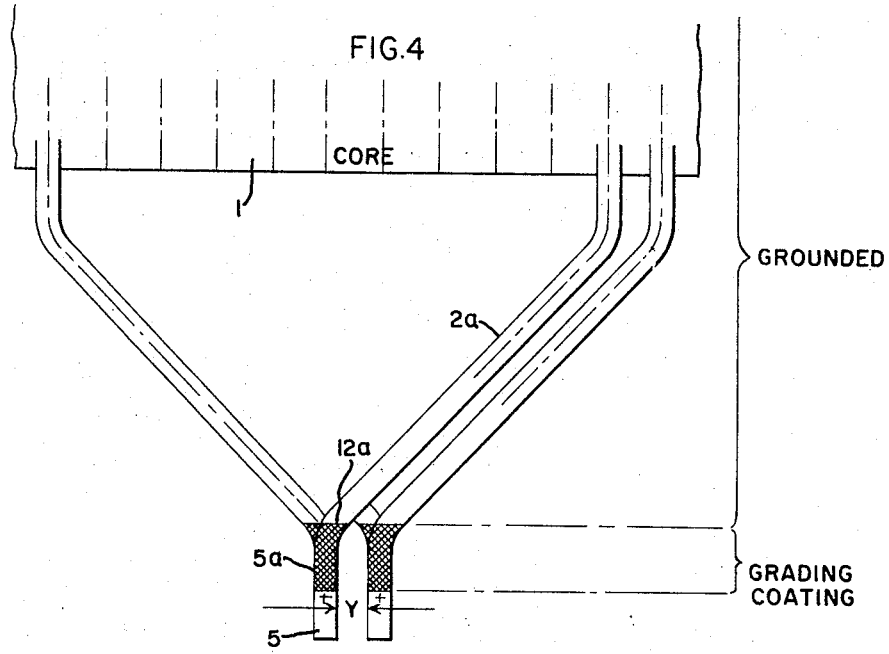

3,354,331
HIGH VOLTAGE GRADING FOR DYNAMO-
ELECTRIC MACHINE
Hermann L. Broeker, Schenectady, Felix Y. Dupont,
Burnt Hills, and Alexander L. Lynn, Duanesburg, N.Y.,
assignors to General Electric Company, a corporation
of New York
Filed Sept. 26, 1966, Ser. No. 581,804
2 Claims. (Cl. 310—196)

ABSTRACT OF THE DISCLOSURE

A high voltage dynamoelectric machine with a two-layer winding has circumferentially extending closely spaced conductors in the end turn region with grounded insulations, connected together by more widely spaced series loops with ungrounded insulation and a stress grading coating applied thereto so as to prevent corona discharges.

---

Figure 5:
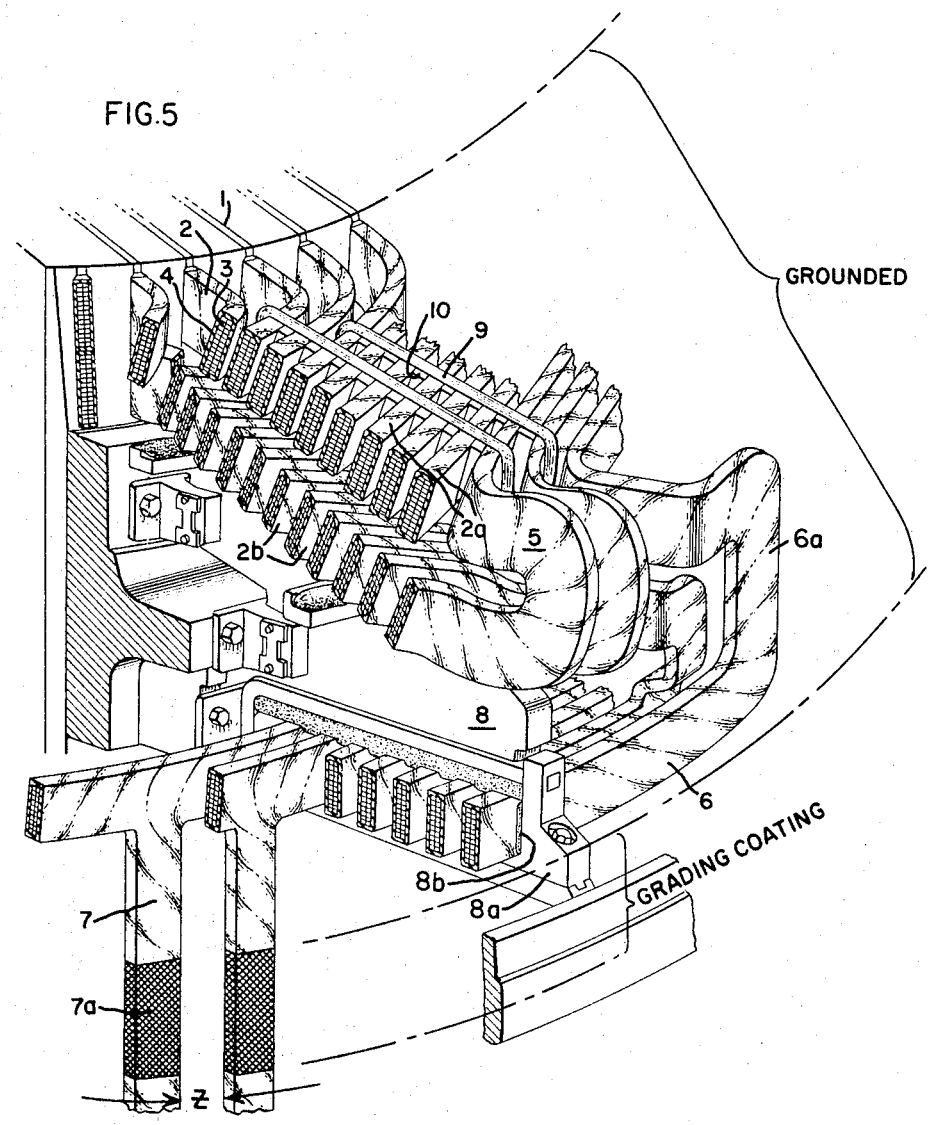

This invention relates to an improved arrangement and method for reducing ionization in the gaps between insulated conductors in a dynamoelectric machine. More particularly, the invention relates to an improved arrangement and method for reducing ionization between insulated conductors of different phase or potential in the closely spaced region of the end turns extending beyond the core of a dynamoelectric machine.

A dynamoelectric machine, such as a large turbine-generator, employs high voltage insulated armature bars which emerge from slots in the laminated stator core and then bend circumferentially from the top and bottom slot positions so as to provide a connection between one bar and a circumferentially spaced bar. The end turn region is very congested and under present techniques of construction, the change of direction of the bars from an axial to a roughly circumferential direction results in the insulated bars lying closely spaced to one another.

High voltage grading coatings are normally applied to the exterior of the insulation for a short distance after the bars have emerged from the grounded stator core. Such coatings consist of conducting or semi-conducting material such as graphite or silicon-carbide in a suitable binder. They serve to gradually reduce the potential difference between the exterior of the insulation at ground and the exterior of the insulation at some other potential determined by the strands inside the insulation.

Beyond the grading coating, there is the possibility of ionization or arcing between different armature bars in the closely spaced end turn region. This can occur where two adjacent coils are in different phases or where they are in the same phase but at sufficient potential difference to ionize the air gap separating the coils, or where the bars are closely spaced to grounded points or planes. The problem can occur between adjacent bars in the same layer or where top and bottom bars cross one another in separate layers.

Accordingly, one object of the invention is to provide an improved arrangement for reducing ionization in the end turn region of a dynamoelectric machine.

Another object of the invention is to provide an improved arrangement and method for positioning the high voltage grading coating in a dynamoelectric machine winding.

Still another object of the invention is to provide an improved grading system, wherein metal or conducting brackets or clips can be used to hold the end turns in place without increasing the likelihood of ionization and arcing between armature bars and ground.

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing, in which:

FIG. 1 is a partial perspective view of the end turns of a conventional prior art grading system in a dynamoelectric machine, FIG. 2 is a similar view of the dynamoelectric machine modified in accordance with one form of the present invention, FIGS. 3 and 4 are developed schematic views of two coil ends of the dynamoelectric machine corresponding to FIGS. 1 and 2 respectively, and FIG. 5 is a view similar to FIGS. 1 and 2 but modified in accordance with another aspect of the invention.

Briefly stated, the invention is practiced by repositioning the grading coating from the conventional location preceding a closely spaced conductor region to a location near the series loops wherein the conductors are more widely spaced, and grounding the conductor outer insulation in the closely spaced region of the end turns.

Referring now to FIG. 1 of the drawing, a prior art dynamoelectric machine end turn arrangement typical of the prior art includes a laminated stator core 1 having longitudinal slots from whence insulated armature bars 2 emerge into the end turn region. The armature bars 2 comprise lightly insulated strands 3 surrounded by a layer of high voltage insulation 4 commonly applied in successive layers of mica tape impregnated with a suitable curable binder.

Armature bars 2 emerging from the top slot bend to extend in one circumferential direction as indicated by bar portions 2a, while bars from the bottom slot curve in the opposite circumferential direction as indicated by bar portions 2b. Portions 2a and 2b are, due to the inherent nature of the construction, more closely spaced than the locations at which they emerge from the slots. Portions 2a and 2b from various slots are commonly connected together at an insulated "series loop" such as the one illustrated at 5. Where the phase end occurs, the conductors are commonly connected to circumferentially extending connection rings 6 by means of insulated jumpers 6a. The connection rings then carry the current to the exterior of the machine through primary leads 7, there commonly being six such leads for a three-phase generator. All of the aforementioned elements, i.e. circumferentially extending bar portions, series loops, jumpers, connection rings 6, and leads 7 are located in what is defined herein as the "end turn region."

The end turns must be held in place against the electromagnetic forces tending to displace them. The construction illustrated is merely one means of holding the end turns in place and is typical of a suitable arrangement. Axial brackets 8 are disposed circumferentially around the end of the core and arranged to slide axially. Insulated bindings such as resin-impregnated glass fiber hold the bar portions 2a, 2b, while insulated blocks 10 maintain proper bar spacing. Under present constructions, ties 9 and blocking 10 must be made of insulating material since, as explained previously, the bars are at different potential and phase. Also the connection rings 6 are firmly held in place by brackets 8a and conforming insulated pads 8b.

Under the prior art construction shown in FIG. 1, the surface of the bars after they have emerged from the grounded stator core is also grounded for a short distance prior to commencing the electrical stress grading. Such a grounded portion is illustrated by reference numeral 11 and may consist of asbestos tape impregnated with conductive graphite. Next, the stress grading is applied and is illustrated by reference numeral 12. This can consist of graphite or silicon-carbide in a suitable binder applied as paint or tape, various types of electrical stress grading material being known to those skilled in the art.

Under the prior art arrangement shown, ionization or arcing can nevertheless occur between bar portions 2a, 2b where the potential is sufficiently great between adjacent bars or layers to cause ionization of the small air gaps.

Reference now to FIG. 2 of the drawing will illustrate the invention in one form. Reference numbers to the same elements are used where they correspond to those in FIG. 1. The arrangement according to the invention, as shown in FIG. 2, differs from FIG. 1 in two respects. First, from a constructional standpoint, the series loops 5 are extended in a roughly axial direction so as to provide an extra long insulated portion 5a. The electrical stress grading coating, which is normally applied close to the stator core (preceding the closely spaced circumferentially extending end turns), is relocated to the series loop region (where the bars have again curved to an axial direction and are relatively widely spaced from one another). The stress grading, indicated at 12a, is applied so as to terminate on the extra length portion 5a of the series loop.

Secondly, the region of closely spaced bar portions 2a, 2b (those extending in a circumferential direction) are grounded so as to be at the same potential as the stator core 1. This may be accomplished by the use of an asbestos graphite-impregnated tape similar to that used in portion 11 of the bar in FIG. 1, or by spraying the region of circumferentially extended bars with a graphite-containing paint. In order to insure that the external surface of all bars in the grounded region are at the same potential, conductive blocks and ties may also be employed in lieu of the insulating blocks and ties 9, 10. Metallic brackets may be used for holding the end turns in place which was heretofore not possible.

Reference to FIGS. 3 and 4 of the drawing shows developed views of two adjacent coils. In FIG. 3, which corresponds to FIG. 1, the prior art grading 12 is commenced in a location preceding the circumferentially extending bar portions 2a. If, for example, bar portions 2a are of a different phase, there is a possibility that the potential difference is sufficient to cause ionization arcing across the closely spaced gap indicated at X.

Referring to FIG. 4 of the drawing, which corresponds to FIG. 2, the stress grading 12a has been relocated to the series loop region. Bar portions 2a are all at ground potential and the only location at which ionization can occur is across a much larger space Y between series loops 5.

Reference to FIG. 5 of the drawing illustrates the invention in another form. This represents an extension of the concept shown in FIGS. 1–4. Instead of locating the stress grading coating on extended series loop portions, the coating is located on primary leads 7 as indicated at 7a. The entire end turn region consisting not only of the circumferentially extending bar portions 2a, 2b but also the series loops 5, jumpers 6a, and connection rings 6 are grounded in the previously described manner. Hence metallic brackets can be used anywhere in the end turn region if desired. The only locations susceptible to arcing or ionization between insulated conductors is across widely spaced gaps such as Z between leads 7. Also, substantial economies may be effected with the FIG. 5 arrangement because only six such stress grading coatings need be applied in the usual three phase machine and the end turn support structure is greatly simplified if everything is at the same potential.

It will be appreciated that the two arrangements shown are merely illustrative of the principle of the invention, wherein the end turns are grounded throughout a closely spaced region and grading is applied thereafter so as to terminate in a region of relatively widely spaced conductors. The aforesaid invention greatly reduces the ionization problems heretofore existent in high voltage dynamoelectric machines in the end turn region and is also applicable to other types of high voltage electric equipment such as transformers and the like.

While there has been shown what is considered to be the preferred embodiment of the invention, it is of course understood that various other modifications may be made therein, and it is intended to cover in the appended claims all such modifications as fall within the true spirit and scope of the invention.

What we claim as new and desire to secure by Letters Patent of the United States, is:

1. In a dynamoelectric machine,
   a core member defining conductor slots,
   a plurality of insulated conductors disposed in said slots and emerging axially therefrom into an end turn region, said conductors extending circumferentially and being closely spaced in a first portion of the end turn region and then extending axially and being more widely spaced in a second portion of the end turn region more distant from the core slots than said first portion,
   series loop conductors connecting together the axially extending conductors in the second portion of the end turn region,
   conductive layers applied to the exterior of the conductor insulation in the first portion to hold them at the same potential as the core member, and
   electrical stress grading layers applied to the exterior of the conductor insulation so as to contact said conductive layers and arranged to terminate in the second portion of the end turn region.

2. In a dynamoelectric machine,
   a grounded core member defining conductor slots,
   a plurality of insulated conductors disposed in said slots and emerging axially therefrom into an end turn region, said conductors bending to extend substantially circumferentially in a first portion of the end turn region, said conductors then extending axially and being connected together in a series loop connection in a second portion of the end turn region more distant from the core slots than the first portion,
   conductive layers applied to the exterior of conductor insulation throughout the circumferentially extending first portion and in contact with the core member, and
   electrical stress grading layers applied to the exterior of the conductor insulation so as to contact the conductive layers and terminating in the second portion of the end turn region.

References Cited

UNITED STATES PATENTS

| | | | |
|---|---|---|---|
| 2,053,422 | 9/1936 | Calvert et al. | 310—196 |
| 2,318,074 | 5/1945 | Hill et al. | 310—196 |
| 2,939,976 | 6/1960 | Manni | 310—196 |

MILTON O. HIRSHFIELD, *Primary Examiner.*

L. L. SMITH, *Assistant Examiner.*